(12) United States Patent
Tian et al.

(10) Patent No.: US 7,844,224 B2
(45) Date of Patent: Nov. 30, 2010

(54) METHOD FOR SUPPORTING SIMULTANEOUSLY MULTIPLE-PATH BLUETOOTH AUDIO APPLICATIONS

(75) Inventors: Dan Tian, Beijing (CN); Xin Zhang, Beijing (CN)

(73) Assignee: IVT (Beijing) Software Technology, Inc., Beijing (CN)

( * ) Notice: Subject to any disclaimer, the term of this patent is extended or adjusted under 35 U.S.C. 154(b) by 562 days.

(21) Appl. No.: 11/919,532

(22) PCT Filed: Apr. 26, 2006

(86) PCT No.: PCT/CN2006/000869
§ 371 (c)(1),
(2), (4) Date: Oct. 29, 2007

(87) PCT Pub. No.: WO2006/116938
PCT Pub. Date: Nov. 9, 2006

(65) Prior Publication Data
US 2009/0081953 A1 Mar. 26, 2009

(30) Foreign Application Priority Data
Apr. 30, 2005 (CN) .......................... 200510011675

(51) Int. Cl.
*H04B 7/00* (2006.01)
(52) U.S. Cl. .................................... 455/41.2
(58) Field of Classification Search ................. 455/41.2
See application file for complete search history.

(56) References Cited

U.S. PATENT DOCUMENTS

2006/0111044 A1* 5/2006 Keller ........................ 455/41.2
2007/0223455 A1* 9/2007 Chang et al. ................. 370/352
2010/0048133 A1* 2/2010 Wang et al. ................. 455/41.3

FOREIGN PATENT DOCUMENTS

JP 2004112107 4/2004
WO 2004052049 6/2004

OTHER PUBLICATIONS

International Search Report from PCT/CN06/000869 dated Jul. 6, 2006.

* cited by examiner

*Primary Examiner*—Matthew D Anderson
*Assistant Examiner*—David Bilodeau
(74) *Attorney, Agent, or Firm*—Thomas J. Engellenner; Giordana M. Belenchia-Sauer; Nutter McClennen & Fish LLP

(57) ABSTRACT

An optimized method for supporting simultaneously multi-path Bluetooth audio application in a system includes said system establishes Bluetooth audio connections with a plurality of remote Bluetooth device simultaneously said system selects or adds dedicated Bluetooth soundcard audio device for each Bluetooth audio connection the data of each Bluetooth audio connection makes interaction with Bluetooth audio application in the system via respective dedicated Bluetooth sound card thus supporting multipath Bluetooth audio application simultaneously is realized in the system. Said system configures the sampling frequency and the sound channel mode of the Bluetooth soundcard audio device based on the format of the Bluetooth audio connection, in order to match the sampling frequency and the sound channel mode of audio data of the Bluetooth audio connection and reduce audio data format conversion. When said system exists a plurality of sound card audio devices only one of the sound card audio devices can become default sound card audio device usually the system sets automatically system default sound card audio device and notify correlative Bluetooth audio application. Said system also can notify correlative Bluetooth audio application that corresponding soundcard audio device hand been all set after said Bluetooth audio connections are established successfully so that multiple sound card are transparent for users.

9 Claims, 3 Drawing Sheets

METHOD FOR SUPPORTING SIMULTANEOUSLY MULTIPLE-PATH BLUETOOTH AUDIO APPLICATIONS

TECHNICAL FIELD

Present invention relates to field of Bluetooth wireless communication technology, and more particularly, to Bluetooth high quality audio Profiles (Bluetooth audio application, A2DP Profile) based on ACL connections, and low quality audio related Profiles (Bluetooth Headset Profile; Bluetooth Hands Free Profile; Bluetooth Cordless Telephone Profile) based on SCO/eSCO connections, and their applications in systems.

BACKGROUND OF THE ART

Bluetooth is a short-range wireless radio frequency communication technology which operates in Industrial Scientific Medical (ISM) band at 2.4 GHz. According to the Bluetooth Specification and Profiles made by Bluetooth Special Interest Group (SIG), the Bluetooth basic network structure is a Piconet composed of one master unit and up to seven slave units. The master unit communicates with its slave units by TDMA. By integrating Bluetooth communication module into each device, diverse kind of the devices can be connected in low cost. Bluetooth Asynchronous Connection-Less Link and Synchronous Connection-Oriented Link can be established among Bluetooth units by using globally unique Bluetooth Unit Address, so as to transmit character data and audio data among them. The functions of one unit may be provided to another unit by way of Bluetooth service, so one unit can provide multiple services simultaneously, and Users can choose some of the services to establish connection according to their needs.

As a short-range wireless radio frequency communication technology, the aim of Bluetooth is to take place of wired connections. It provides SCO/eSCO link to transmit real-time voice signals with low sampling frequency, where users can conveniently receive or dial phones by handsets (Headset, Hands Free, Cordless Telephone Profile); at the same time, it uses ACL link to transmit high quality audio encoding data (MP3, SBC format), so users can conveniently listen to the music, etc.(Bluetooth AV Profile)

In a computer operating system, Bluetooth soundcard audio unit should be incorporated into the operating system in order to implement the support to Bluetooth audio application. The Bluetooth audio application in operating system outputs audio data to Bluetooth soundcard audio unit, and the Bluetooth soundcard audio unit converts the audio data and transmits them to remote Bluetooth unit via Bluetooth audio connection. Following the reverse direction, the system receives audio data from remote Bluetooth unit via Bluetooth audio connection and the said audio data is reported to Bluetooth soundcard audio unit. And then the said audio data is converted in the Bluetooth soundcard unit and reported to Bluetooth audio application in the operating system.

Currently, only one Bluetooth soundcard audio unit is added into the operating system of computers in the scheme for supporting Bluetooth audio Profile (application). Any Bluetooth audio applications, like high quality Bluetooth audio application and low quality Bluetooth audio application are all supported via the Bluetooth soundcard audio unit.

One disadvantage of the scheme is that the operating system can only support one Bluetooth audio application simultaneously because there is only one Bluetooth soundcard audio unit. Even if multiple Bluetooth audio applications can be made to use the same Bluetooth soundcard audio unit, the audio data from the multiple Bluetooth audio applications shall be mixed together, resulting in unacceptable usage effects. However, in practical applications, multiple Bluetooth audio applications often need to be connected at the same time, for example, using an ordinary Bluetooth earphone to establish Bluetooth call based on SCO/eSCO link while playing songs on another stereo Bluetooth earphone.

Another disadvantage of the scheme is that it is impossible to achieve optimal matching between Bluetooth audio applications and formats of audio data supported by the Bluetooth audio connection established, due to the use of single Bluetooth soundcard audio unit. Because Bluetooth soundcard audio unit reports the supported sampling frequency (from 8 KHz to 44.1 KHz and above) and sound track mode (single sound track and dual (or stereo) sound track) to the system and to audio application via system standard interface, so when the Bluetooth soundcard audio unit supports both high quality Bluetooth audio application and low quality Bluetooth audio application, the Bluetooth soundcard audio unit will report to the system and audio application that the supported sampling frequency will be from 8 KHz to 44 KHz and above, and that the sound track modes will include single sound track and dual sound track. Since audio applications usually employ the highest sampling frequency and the optimal dual sound track mode of the soundcard, the Bluetooth audio data output by the lower layer interface of Bluetooth soundcard audio unit corresponds with higher sampling frequency. Thus, for low quality Bluetooth audio applications, the higher sampling frequency/sound track mode of the audio data output by Bluetooth soundcard audio unit may not match the lower sampling frequency/sound track mode of the data from the low quality Bluetooth audio connection that has been established. And the format conversion for the Bluetooth audio data output by the Bluetooth soundcard audio unit is needed, namely to convert the high sampling frequency/dual sound track into 8 KHz (16 KHz)/single sound track corresponding to Bluetooth SCO/eSCO link, which will increase the conversion burden of the system.

SUMMARY OF THE INVENTION

To solve the problems mentioned above, present invention provides a method for supporting multiple Bluetooth audio applications in computer operating system simultaneously, which includes: When a Bluetooth audio application is communicating with a remote Bluetooth unit via a Bluetooth soundcard audio unit in the system, if another Bluetooth audio application intends to communicate with another remote Bluetooth unit, another Bluetooth audio connection is established between said system and said another remote Bluetooth unit. After the another Bluetooth audio connection is established, the system acquires another corresponding Bluetooth soundcard audio unit for said another Bluetooth audio application. Said another Bluetooth audio application is made to communicate with said another remote Bluetooth unit via said another Bluetooth soundcard audio unit.

According to one embodiment of present invention, the system acquiring the another corresponding Bluetooth soundcard audio unit includes incorporating or acquiring Bluetooth soundcard audio unit by one of the two ways described below:

(a) The first way is: in the system, adding a Bluetooth soundcard audio unit for the Bluetooth audio connection of each Bluetooth audio application, that is to say, after remote Bluetooth audio unit has established Bluetooth audio connection with the local computer, a Bluetooth soundcard audio unit is added for said Bluetooth audio connection. Said Bluetooth soundcard audio unit is dedicated to said Bluetooth audio connection of remote Bluetooth audio unit. The Bluetooth audio data of the Bluetooth audio connection are all communicated with the Bluetooth audio application of the operating system via said Bluetooth soundcard audio unit;

(b) The second way is: two Bluetooth soundcard audio units are added in the system for high quality Bluetooth audio application and low quality Bluetooth audio application respectively, wherein a high quality Bluetooth soundcard audio unit is dedicated to high quality Bluetooth audio application, that is to say, the Bluetooth audio data of the high quality Bluetooth audio connection are all communicated with the audio application of the operating system via said Bluetooth soundcard audio unit; the other low quality Bluetooth soundcard audio unit is dedicated to low quality Bluetooth audio application, that is to say, the Bluetooth audio data of the low quality Bluetooth audio connection are all communicated with the audio application in operating system via said Bluetooth soundcard audio unit. This way is the simplified version of the first one, because for ordinary users, in many cases only one Bluetooth low quality audio connection and one Bluetooth high quality audio connection are used, it is feasible that only one quality Bluetooth soundcard audio unit and one low quality Bluetooth soundcard audio unit are added.

According to another embodiment of present invention, the format of the audio data from Bluetooth soundcard audio unit is configured to match sampling frequency of the data from Bluetooth audio connection.

Preferably, specific programming control interfaces may be added for Bluetooth soundcard audio unit. The audio data format supported and reported to operating system and audio application by the Bluetooth soundcard audio unit, for example sampling frequency and sound track mode, is configured through said interfaces. The configuration can be done by one of the two modes listed below:

(a) Fixing mode: the Bluetooth soundcard audio unit dedicated to high quality Bluetooth audio application is configured to support sampling frequency higher than 16 KHz, and support dual sound track mode; the Bluetooth soundcard audio unit dedicated to low quality Bluetooth audio application is configured to support sampling frequencies that equals to the sampling frequency of 8 KHz or 16 KHz in the Bluetooth SCO/eSCO link-path, and support single sound track mode only. Wherein, the fixing mode of Bluetooth soundcard audio unit can be configured to be the corresponding fixed sampling frequency and sound track mode during the system initiation via programming control interface.

(b) Dynamically configurable mode: in the case that Bluetooth soundcard audio unit supports all sampling frequencies and stereo and single sound track modes, after the Bluetooth audio connection has been established, the system dynamically configures sampling frequency and sound track mode of Bluetooth soundcard audio unit via programming control interfaces of Bluetooth soundcard audio unit, based on the sampling frequency and sound track mode of audio data from Bluetooth audio connection.

With the above modes, in fixing mode, because the sampling frequency and sound track mode of the Bluetooth soundcard audio unit directly correspond to those of the audio data from high/low quality Bluetooth audio connection, no format conversion is needed for the data output from lower layer interface of the Bluetooth soundcard audio unit and the data can be sent directly to remote Bluetooth unit via Bluetooth. And no format conversion is needed either for the data received from remote Bluetooth unit via Bluetooth audio connection, the data can be input directly into lower layer interface of Bluetooth soundcard audio unit; However, as for the dynamically configurable mode, because the sampling frequency and sound track mode of dynamically configured Bluetooth soundcard audio unit match those of audio data from Bluetooth audio connection, no format conversion is needed for the data output from the lower layer interface of the Bluetooth soundcard audio unit, and the data can be sent directly to remote Bluetooth unit via Bluetooth. Similarly, no format conversion is needed either for the data received from remote Bluetooth unit via Bluetooth audio connection, and the data can be sent directly to lower layer interface of Bluetooth soundcard audio unit. Therefore, both modes mentioned above can realize the purpose of reducing format conversion of audio data.

According to yet another embodiment of present invention, when there are multiple soundcard audio units in the system, appropriate Bluetooth soundcard audio unit should be acquired for Bluetooth audio application based on the format of audio data of Bluetooth audio connection, which makes the multiple soundcard audio units transparent to users and audio applications.

BRIEF DESCRIPTION OF THE DRAWINGS

It'll be helpful for those skilled in the art to understand the objects, technical features and advantages of present invention by the following detailed description of embodiments with reference to the drawings, wherein.

DETAILED DESCRIPTION OF EMBODIMENTS

Figure 1:
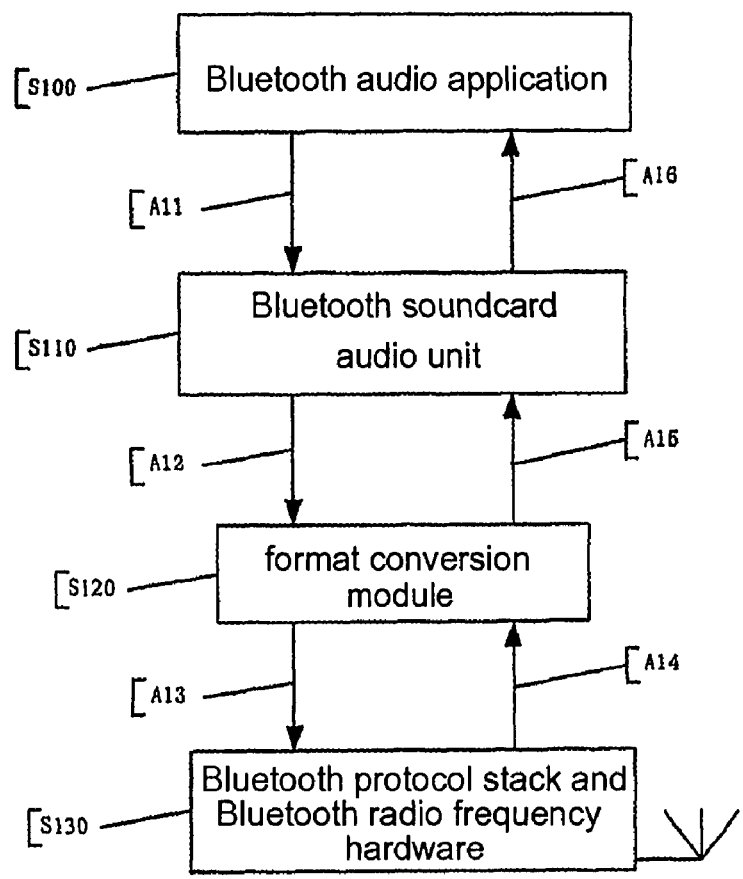
FIG. 1 is the block diagram of a conventional system comprising Bluetooth soundcard audio unit, wherein, the format conversion of audio data is required.

FIG. 1 is the block diagram of conventional system comprising Bluetooth soundcard audio unit, wherein, the Bluetooth soundcard audio unit is required to convert the format of audio data.

In the conventional systems, there is only one Bluetooth soundcard audio unit S110, and a Bluetooth audio application S100 uses maximum sampling frequency and sound track mode reported by Bluetooth soundcard audio unit in default, and transmits audio data stream A11 to Bluetooth soundcard audio unit via upper layer interface of Bluetooth soundcard audio unit. Then, the audio data stream A11 is converted into Bluetooth audio stream A12 via Bluetooth soundcard audio unit. If the format of said Bluetooth audio stream A12 is inconsistent with the format defined by Bluetooth audio connection, the Bluetooth audio stream A12 is required to be converted into Bluetooth audio stream A13 via format conversion module S120 before being transmitted to remote Bluetooth unit via Bluetooth protocol stack and Bluetooth radio frequency hardware S130. Similarly, if the format of Bluetooth audio A14 received in Bluetooth protocol stack and Bluetooth radio frequency hardware S130 from remote Bluetooth unit is inconsistent with the format of Bluetooth soundcard audio unit, said Bluetooth audio stream A14 is required to be converted into audio stream A15 via format conversion module S120 before being transmitted to lower layer interface of Bluetooth soundcard audio unit. And audio data stream 16 is transmitted to audio application S100 via upper layer interface of Bluetooth soundcard audio unit.

Figure 2:
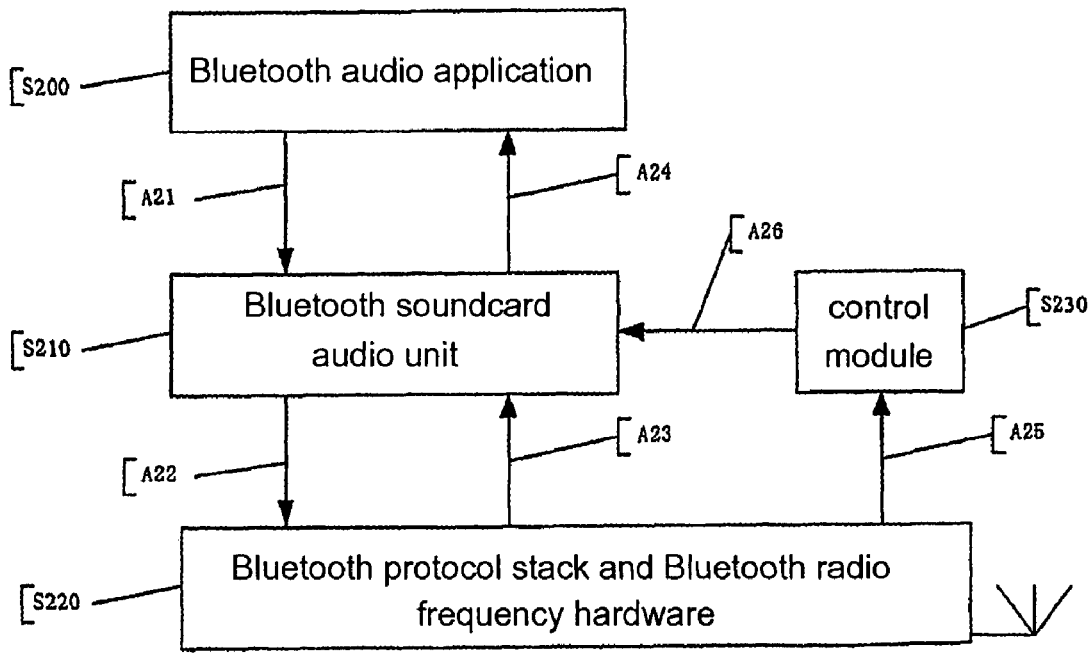
FIG. 2 is the block diagram of a system comprising Bluetooth soundcard audio unit in accordance with present invention, wherein, the sampling frequency and mode of the Bluetooth soundcard audio unit can be configured.

FIG. 2 is the block diagram of a system comprising a Bluetooth soundcard audio unit in accordance with present invention, wherein, the sampling frequency and mode of the Bluetooth soundcard audio unit are configured.

Said Bluetooth soundcard audio unit is presented as a soundcard audio unit having standard system interface to the operating system. A Bluetooth audio application opens Bluetooth soundcard audio unit and sends audio data to said Bluetooth soundcard audio unit via upper layer interface of the Bluetooth soundcard audio unit, then the audio data is output from lower layer interface of Bluetooth soundcard audio unit via Bluetooth soundcard audio unit. Data output from lower layer interface of Bluetooth soundcard audio unit is sent to remote Bluetooth unit via Bluetooth protocol stack and Bluetooth radio frequency hardware. By following the reverse direction, the audio data received from remote Bluetooth unit via Bluetooth protocol stack and Bluetooth radio frequency hardware is input into lower layer interface of Bluetooth soundcard audio unit, and then sent to audio application from upper layer interface of Bluetooth soundcard audio unit via Bluetooth soundcard audio unit.

In the system of present invention, a control module S230 is included. When a Bluetooth audio connection is successfully established, the control module S230 can acquire the format information A25 of audio data of said Bluetooth audio connection, based on which, the control module S230 reports the supported format of audio data, for example sampling frequency and sound track mode, to Bluetooth soundcard audio unit and system via programming control interface of Bluetooth soundcard audio unit, and configure them A26. Thus, the format of input and output audio data streams A21, A24 between Bluetooth audio application S200 and upper layer interface of Bluetooth soundcard audio unit completely matches the format of input and output Bluetooth audio streams A22, A23 between Bluetooth protocol stack and Bluetooth radio frequency hardware (S220) and lower layer interface of Bluetooth soundcard audio unit. So it is not necessary to make any conversion between audio data streams. After that, the system notifies related Bluetooth audio application S200 that the Bluetooth soundcard audio unit S210 has been configured. Then, said Bluetooth audio application S200 can open said Bluetooth soundcard audio unit S210. If said Bluetooth audio application S200 has already opened Bluetooth soundcard audio unit, the Bluetooth soundcard audio unit needs to be closed first, and then reopened.

Figure 3:
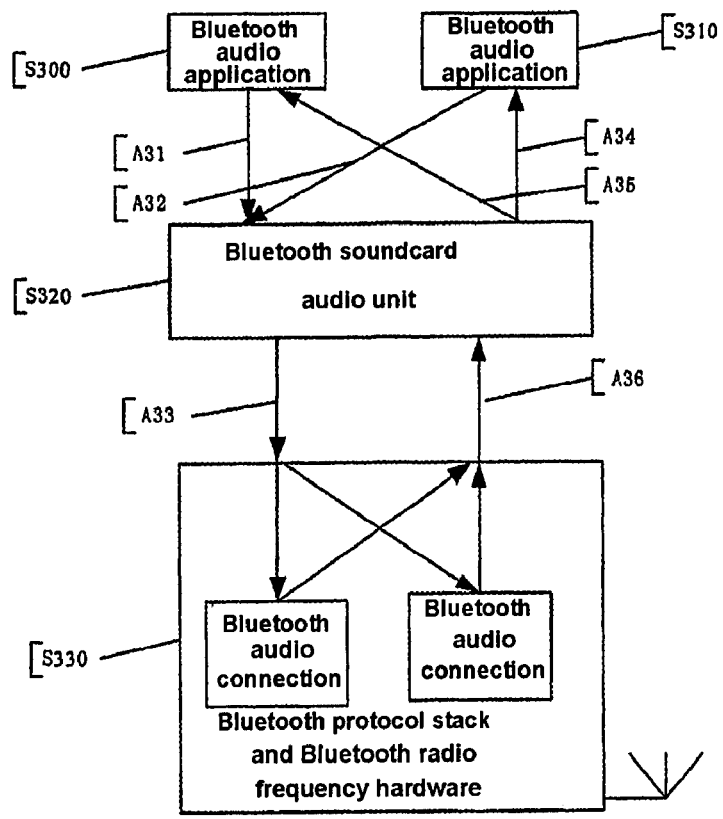
FIG. 3 is the schematic diagram of a conventional system in which a Bluetooth soundcard audio unit is adopted to support multiple-path Bluetooth audio applications.

FIG. 3 is the schematic diagram of a conventional system in which a Bluetooth soundcard audio unit is adopted to support multiple-path Bluetooth audio applications.

When multiple Bluetooth audio applications S300, S310 share the same Bluetooth soundcard audio unit S320, audio data A31 and A32 sent to Bluetooth soundcard audio unit S320 from Bluetooth audio applications S300, S310 will be intermixed into a Bluetooth audio stream A33 through the Bluetooth soundcard audio unit S320, being sent to two remote Bluetooth unit respectively via Bluetooth protocol stack and Bluetooth radio frequency hardware S330. And audio data A36 from two remote Bluetooth units will be input through lower layer interface of Bluetooth soundcard audio unit and intermixed by Bluetooth soundcard audio unit, being sent to two audio applications S300, S310 respectively.

This is the situation users do not wish to happen in most cases, for example: When a user is listening to the music using AV earphone, he may need to answer network IP phone with Bluetooth earphone. If the two Bluetooth audio applications are executed simultaneously in a system as shown in FIG. 3, the user will hear mixed sound of phone voice and local music, which is unacceptable for the user.

Figure 4:
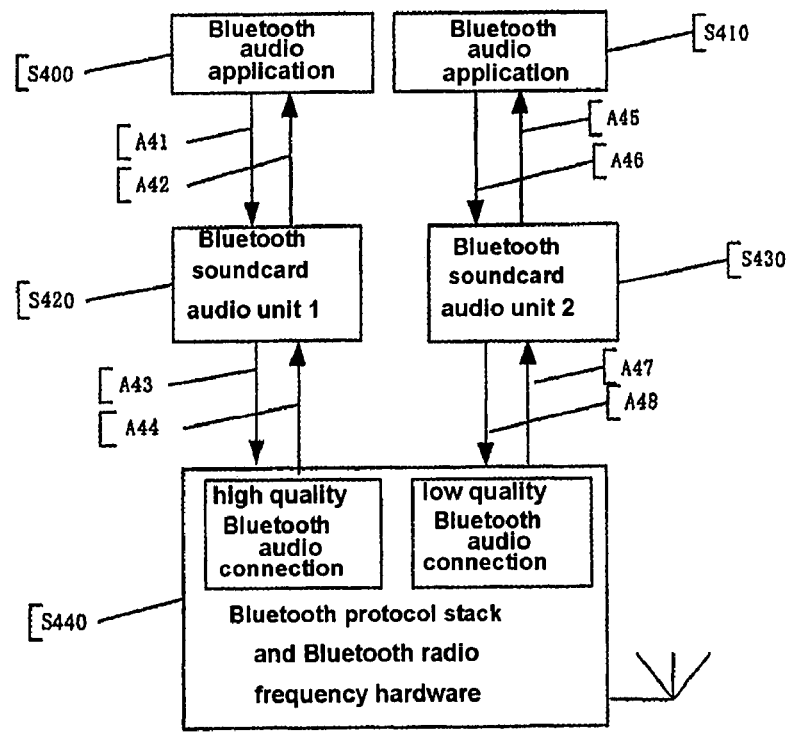
FIG. 4 is the schematic diagram of a system in which multiple Bluetooth soundcard audio unit is adopted to support multiple-path Bluetooth audio applications in accordance with the present invention.

FIG. 4 is the schematic diagram of a system in which multiple Bluetooth soundcard audio units are adopted to support multiple-path Bluetooth audio applications in accordance with the present invention In order to simultaneously support multiple Bluetooth audio applications S400, S410, the system establishes multiple Bluetooth audio connections with multiple remote Bluetooth units, so that each Bluetooth audio connection has a dedicated Bluetooth soundcard audio unit S420, S430. Audio data transmitted on each Bluetooth audio connection is sent to corresponding Bluetooth audio application only via its dedicated Bluetooth soundcard audio unit, so as to realize the simultaneous support of multiple-path Bluetooth audio application in the system.

In the situation of supporting multiple-path Bluetooth audio application, the system dynamically configures sampling frequency and sound track mode of corresponding Bluetooth soundcard audio unit for the Bluetooth audio application S400, S410, according to the Bluetooth audio connection type of said Bluetooth audio application.

Alternatively, the corresponding high quality or low quality Bluetooth soundcard audio units may be acquired according to the established Bluetooth audio connection types, and then the corresponding Bluetooth audio application S400 or S410 in the system is notified correspondingly. As shown in FIG. 4, assuming Bluetooth audio application S400 is high quality Bluetooth audio application and Bluetooth soundcard audio unit 1 S420 is high quality Bluetooth soundcard audio unit, the system will acquire the high quality Bluetooth sound audio unit S420 for the corresponding high quality Bluetooth audio connection, and notifies Bluetooth audio application S400 to open the high quality Bluetooth soundcard audio unit S420. The format of output and input data streams A41 and A42 through the upper layer interface of high quality Bluetooth soundcard audio unit 1 S420 are completely the same as the format of output and input data streams A43 and A44 through the lower layer interface between Bluetooth soundcard audio unit 1 S420 and Bluetooth protocol stack and Bluetooth radio frequency hardware S440, so it is not necessary to make any conversion between audio data streams. Assuming Bluetooth audio application S410 is low quality Bluetooth audio application, Bluetooth soundcard audio unit 2 S430 is low quality Bluetooth soundcard audio unit, the system acquires low quality Bluetooth soundcard audio unit S430 for the corresponding low quality Bluetooth audio connection, and notifies Bluetooth audio application S410 to open low quality Bluetooth soundcard audio unit S430. The format of output and input data streams A45 and A46 through the upper layer interface of low quality Bluetooth soundcard audio unit 2 S430 are completely the same as the format of output and input data streams A47 and A48 through the lower layer interface between Bluetooth soundcard audio unit 2 S430 and Bluetooth protocol stack and Bluetooth radio frequency hardware S440, so it is not necessary to make any conversion between audio data streams. With present invention, users may have multiple-path audio applications simultaneously, and Bluetooth audio data of each application are independent without any disturbance.

On the other side, when there are multiple Bluetooth soundcard audio units, it is necessary for the system to dynamically correlate the establishment of Bluetooth audio connection with the selection of soundcard audio unit. Usually, there is only one default soundcard audio unit in the system, and when there are multiple soundcard audio unit (including traditional physical soundcard audio unit and Bluetooth soundcard audio unit) in the system, it is necessary for the system to select appropriate soundcard audio unit for respective audio application automatically without manually assigning the default soundcard audio unit in the system, thus the complex operations are avoided.

Figure 5:
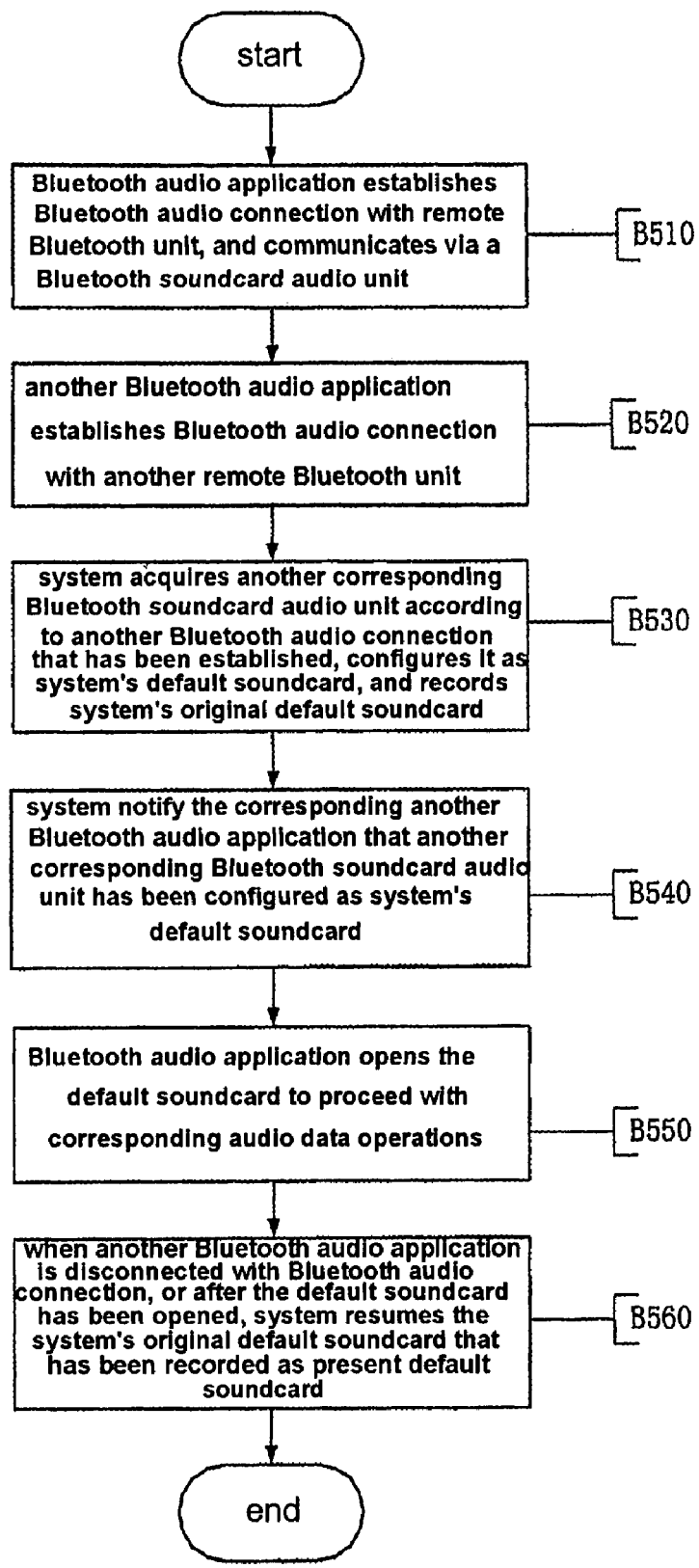
FIG. 5 is the schematic diagram showing multiple Bluetooth soundcard audio units are used to support multiple-path Bluetooth audio applications in accordance with the present invention.

Next, the process will be explained with reference to FIG. 4 and FIG. 5, by following this process the Bluetooth audio application uses corresponding Bluetooth soundcard audio unit to operate audio data in multiple Bluetooth audio applications, wherein the system will automatically configure the default soundcard after the establishment of Bluetooth audio connection or notify the corresponding Bluetooth audio application of the selection of Bluetooth soundcard audio unit.

In the system, in step B510, the Bluetooth audio connection between Bluetooth audio application S400 and remote Bluetooth unit (not shown) has been established, and the Bluetooth audio application S400 communicates via Bluetooth soundcard unit 1 S420. Another Bluetooth audio application S410 intends to establish Bluetooth audio connection with another remote Bluetooth unit. After the establishment of Bluetooth audio connection with another Bluetooth unit B520, according to the descriptions above, the system acquires (selects) corresponding Bluetooth soundcard audio unit 2 S430 based on the established Bluetooth audio connection, sets it as system's default soundcard, and records the system's original default soundcard simultaneously B530. Then, the system notifies the Bluetooth audio application S410, via message or function call, that the corresponding Bluetooth soundcard audio unit 2 S430 has been set as system's default soundcard, B540. Said Bluetooth audio application S410 directly opens said default soundcard, namely the Bluetooth soundcard audio unit 2 S430, to proceed with corresponding audio data operation B550.

The system will resume system's original default soundcard that has been recorded B560, when said Bluetooth audio connection is disconnected or after said Bluetooth audio application S410 has opened said default soundcard, namely the Bluetooth soundcard audio unit 2 S430.

As an alternative, after the successful establishment of Bluetooth audio connection, the corresponding Bluetooth audio applications can be notified by the way that The corresponding Bluetooth soundcard audio unit is ready. After the Bluetooth audio connection has been established between system and remote Bluetooth unit, the system does not reset default soundcard, but notifies, via message or function call, Bluetooth audio application S410 of the Bluetooth soundcard audio unit 2 S430 corresponding to said Bluetooth audio connection. Said Bluetooth audio application S410 opens said Bluetooth soundcard audio unit 2 S430 directly and proceeds with corresponding audio data operation.

With above means, users don't have to choose soundcard audio unit manually for audio applications after the establishment of Bluetooth audio connection, and the convenience is improved for the users.

While embodiments of the present invention have been shown and described herein for purposes of illustration, within the true spirit and scope of this invention and the appended claims, many modifications and changes will become apparent to those skilled in the art.

The invention claimed is:

1. A method for supporting multiple-path Bluetooth audio applications simultaneously in a system, said method includes:
    A Bluetooth audio application communicates with a remote Bluetooth unit via a Bluetooth soundcard audio unit, wherein,
    When another Bluetooth audio application intends to communicate with another remote Bluetooth unit, the method includes the following steps:
    The system establishes another Bluetooth audio connection with said another remote Bluetooth unit;
    Acquiring another corresponding Bluetooth soundcard audio unit for said another Bluetooth audio application based on said another Bluetooth audio connection, including:
    Estimating whether the said another Bluetooth audio connection is a connection of a high quality Bluetooth audio application or a connection of a low quality Bluetooth audio application,
    If said another Bluetooth audio connection is a connection of a high quality Bluetooth audio application, a high quality Bluetooth soundcard audio unit is added or an existing high quality Bluetooth soundcard audio unit is selected as said another Bluetooth soundcard audio unit, and if said another Bluetooth audio connection is a connection of a low quality Bluetooth audio application, a low quality Bluetooth soundcard audio unit is added or an existing low quality Bluetooth soundcard audio unit is selected as said another Bluetooth soundcard audio unit; and
    Making said another Bluetooth audio application communicate with said another remote Bluetooth unit via said another Bluetooth soundcard audio unit.

2. Method of claim 1, wherein, the steps of making said another Bluetooth audio application communicate with said another remote Bluetooth unit via said another Bluetooth soundcard audio unit includes:
    Setting said another corresponding Bluetooth soundcard audio unit as system's default soundcard, and recording the system's original default soundcard;
    Notifying by the system said another Bluetooth audio application that the default soundcard is ready, said another Bluetooth audio application opens said default soundcard to proceed with corresponding audio data;
    When said another Bluetooth audio connection is disconnected or after said another Bluetooth audio application has opened said default soundcard, the system resumes the original default soundcard that has been recorded.

3. Method of claim 1, wherein, the steps of making said another Bluetooth audio application communicate with said another remote Bluetooth unit via said another Bluetooth soundcard audio unit includes:
    Notifying by the system said another Bluetooth audio application of said another corresponding Bluetooth soundcard audio unit, and said another Bluetooth audio application opens said another Bluetooth soundcard audio unit to proceed with corresponding audio data.

4. Method of claim 1, wherein, the said high quality Bluetooth soundcard audio unit is configured to support dual sound track mode and sampling frequency higher than 16 KHz; while the said low quality Bluetooth soundcard audio unit is configured to only support single sound track mode and sampling frequency equal to that used by SCO/eSCO link-path.

5. Method of claim 1, wherein, the step of acquiring another corresponding Bluetooth soundcard audio unit for said another Bluetooth audio application includes:
- Acquiring the format of audio data of said another Bluetooth audio connection;
- A Bluetooth soundcard unit is added or an existing Bluetooth soundcard audio is selected as said another Bluetooth soundcard audio unit according to the format of the audio data, and the audio data format supported and reported to the system by said another Bluetooth soundcard audio unit is configured to match the audio data format of said another Bluetooth audio connection via the programming control interface of said another Bluetooth soundcard audio unit.

6. Method of claim 5, wherein, said format of audio data includes sampling frequency and sound track mode.

7. A method for supporting multiple-path Bluetooth audio applications simultaneously in a system, said method includes:
- A Bluetooth audio application communicates with a remote Bluetooth unit via a Bluetooth soundcard audio unit, wherein,
- When another Bluetooth audio application intends to communicate with another remote Bluetooth unit, the method includes the following steps:
- The system establishes another Bluetooth audio connection with said another remote Bluetooth unit;
- Acquiring another corresponding Bluetooth soundcard audio unit for said another Bluetooth audio application based on said another Bluetooth audio connection, including
  - Acquiring the format of audio data of said another Bluetooth audio connection;
  - A Bluetooth soundcard unit is added or an existing Bluetooth soundcard audio is selected as said another Bluetooth soundcard audio unit according to the format of the audio data, and the audio data format supported and reported to the system by said another Bluetooth soundcard audio unit is configured to match the audio data format of said another Bluetooth audio connection via the programming control interface of said another Bluetooth soundcard audio unit; and
- Making said another Bluetooth audio application communicate with said another remote Bluetooth unit via said another Bluetooth soundcard audio unit.

8. The method of claim 7, wherein, said format of audio data includes sampling frequency and sound track mode.

9. Method of claim 7, wherein, the steps of making said another Bluetooth audio application communicate with said another remote Bluetooth unit via said another Bluetooth soundcard audio unit includes:
- Setting said another corresponding Bluetooth soundcard audio unit as system's default soundcard, and recording the system's original default soundcard;
- Notifying by the system said another Bluetooth audio application that the default soundcard is ready, said another Bluetooth audio application opens said default soundcard to proceed with corresponding audio data;
- When said another Bluetooth audio connection is disconnected or after said another Bluetooth audio application has opened said default soundcard, the system resumes the original default soundcard that has been recorded.

* * * * *